US009293276B2

United States Patent
Kawamura et al.

(10) Patent No.: US 9,293,276 B2
(45) Date of Patent: Mar. 22, 2016

(54) ELECTRONIC COMPONENT ASSEMBLY STRUCTURE AND ELECTRICAL JUNCTION BOX

(71) Applicant: Yazaki Corporation, Tokyo (JP)

(72) Inventors: Yukihiro Kawamura, Shizuoka (JP); Hiroaki Yamada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/836,365

(22) Filed: Aug. 26, 2015

(65) Prior Publication Data

US 2015/0364270 A1    Dec. 17, 2015

Related U.S. Application Data

(63) Continuation of application No. PCT/JP2014/056698, filed on Mar. 13, 2014.

(30) Foreign Application Priority Data

Mar. 14, 2013    (JP) ................................. 2013-052460

(51) Int. Cl.
  *H01H 9/02*    (2006.01)
  *H01R 9/24*    (2006.01)
  (Continued)

(52) U.S. Cl.
  CPC ............... *H01H 9/02* (2013.01); *H01R 9/2408* (2013.01); *H01R 9/2416* (2013.01); *H01R 33/975* (2013.01); *H02G 15/10* (2013.01); *H01H 2223/044* (2013.01)

(58) Field of Classification Search
  CPC ............................ H01R 9/2048; H01R 9/2416
  See application file for complete search history.

(56) References Cited

U.S. PATENT DOCUMENTS

| | | | |
|---|---|---|---|
| 5,398,015 A | 3/1995 | Kudo et al. | |
| 2002/0006742 A1* | 1/2002 | Hara | H01R 9/24 439/76.2 |

(Continued)

FOREIGN PATENT DOCUMENTS

| | | |
|---|---|---|
| JP | 6-48149 U | 6/1994 |
| JP | 10-97825 A | 4/1998 |

(Continued)

OTHER PUBLICATIONS

International Search Report for PCT/JP2014/056698 dated May 20, 2014 [PCT/ISA/210].

(Continued)

*Primary Examiner* — Hung V Ngo
(74) *Attorney, Agent, or Firm* — Sughrue Mion, PLLC

(57) ABSTRACT

An electronic component including a lead terminal is inserted into a housing member, and the lead terminal is fitted to a terminal fitting held by the housing member, so that the electronic component is assembled to the housing member. The lead terminal includes a connection portion which is continuous to a base end and is suspended along a side surface of a component main body. The housing member includes a first housing chamber which accommodates the component main body and a second housing chamber which holds the terminal fitting, the first housing chamber is surrounded by a frame-shaped wall portion. The terminal fitting is disposed so as to face the side surface of the component main body, in which a spring portion pressing the connection portion is accommodated in the first housing chamber, with the wall portion interposed therebetween.

17 Claims, 12 Drawing Sheets

(51) Int. Cl.
*H01R 33/975* (2006.01)
*H02G 15/10* (2006.01)

(56) References Cited

U.S. PATENT DOCUMENTS

| | | | | |
|---|---|---|---|---|
| 2002/0142670 A1* | 10/2002 | Listing | H01H 9/10 | 439/709 |
| 2003/0211760 A1* | 11/2003 | Ito | H01R 13/514 | 439/76.2 |
| 2004/0082214 A1* | 4/2004 | Lafragette | H02B 1/26 | 439/342 |
| 2004/0087215 A1* | 5/2004 | Pohl | H01H 9/10 | 439/638 |
| 2005/0136707 A1* | 6/2005 | Kiyota | H01R 9/2408 | 439/76.2 |
| 2008/0164130 A1* | 7/2008 | Adunka | H01H 11/0031 | 200/293 |
| 2009/0149074 A1* | 6/2009 | Koellmann | H01R 9/2408 | 439/638 |
| 2009/0203236 A1 | 8/2009 | Akahori et al. | | |
| 2011/0056819 A1* | 3/2011 | Bower | H01H 71/0271 | 200/5 B |
| 2012/0057307 A1* | 3/2012 | Kang | H01R 9/2416 | 361/728 |
| 2013/0082048 A1* | 4/2013 | Hirasawa | H01R 13/73 | 220/3.9 |

FOREIGN PATENT DOCUMENTS

| | | |
|---|---|---|
| JP | 2002-325336 A | 11/2002 |
| JP | 2009-171763 A | 7/2009 |
| JP | 2009-189193 A | 8/2009 |
| JP | 2010-221787 A | 10/2010 |

OTHER PUBLICATIONS

Written Opinion of the International Search Authority for PCT/JP2014/056698 dated May 20, 2014 [PCT/ISA/237].

* cited by examiner

ELECTRONIC COMPONENT ASSEMBLY STRUCTURE AND ELECTRICAL JUNCTION BOX

CROSS-REFERENCE TO RELATED APPLICATION

This application is a continuation application of International Application PCT/JP2014/056698, filed on Mar. 13, 2014, which claims priority from Japanese Patent Application No. 2013-052460, filed on Mar. 14, 2013, the contents of all of which are incorporated herein by reference in their entirety.

BACKGROUND OF THE INVENTION

1. Field of the Invention

The present invention relates to an electronic component assembly structure and an electrical junction box, and particularly, to an electronic component assembly structure provided in an electrical junction box mounted on a mobile vehicle such as an automobile.

2. Description of the Related Art

Generally, a mobile vehicle such as an automobile is equipped with an electrical junction box which accommodates an electronic component such as a relay for controlling a connection between a power supply and an electric component (see Japanese Patent Application Laid-open No. 2010-221787).

As illustrated in FIG. 14, a relay of the related art includes a rectangular parallelepiped relay body 11 and a plurality of plate-shaped lead terminals 12 which linearly protrudes from one surface (a bottom surface) of the relay body 11. For example, such a relay forms a relay module while being assembled to a resinous holding member 15 holding a terminal fitting 14 to which an electrical wire 13 is connected, and the relay module (the holding member 15) is assembled to an electrical junction box. The terminal fitting 14 is provided with a spring portion 16 to which the lead terminal 12 is connected, and the front ends of the plurality of lead terminals 12 are respectively fitted into the spring portions 16, so that the relay is held by the holding member 15. In addition, FIG. 149 is basically a longitudinal sectional view of the relay module of the related art, but only a relay body 191 is illustrated as a side view.

Incidentally, in the relay module of FIG. 14, the relay body 11 including a portion of the center of gravity of the relay and the terminal fitting 14 (the spring portion 16) supporting the relay body 11 are disposed so as to be separated from each other in the assembly direction of the relay (the up and down direction of FIG. 14). For this reason, for example, when the electrical junction box is vibrated with the rolling of a vehicle, the relay is vibrated with respect to the holding member 15, for example, in the direction of the arrow. Then, a burden on the spring portion 16 that supports the relay body 11 increases as the distance between the center of gravity of the relay body 11 and the spring portion 16 of the terminal fitting 14 in the assembly direction of the relay increases.

As a method of preventing the vibration of such a relay body 11, a method may be supposed which increases a holding force (a spring force) causing the spring portion 16 of the terminal fitting 14 to hold the lead terminal 12. However, there is a concern that the terminal fitting 14 or the holding member 15 may be increased in size. Further, a case may be supposed in which, for example, another member holding the relay body 11 may be provided other than the terminal fitting 14. However, there is a concern that the structure of the relay module may be complex and the component cost may be increased.

SUMMARY OF THE INVENTION

The present invention is made in consideration of the above-mentioned situations and an object thereof is to suppress a vibration of an electronic component with a simple configuration.

In order to solve the above mentioned problem and achieve the object, an electronic component assembly structure according to one aspect of the present invention includes an electronic component configured to include a rectangular parallelepiped component main body and a plurality of lead terminals provided in the component main body; a housing member configured to accommodate the electronic component inserted thereinto; and a plurality of terminal fittings configured to be held by the housing member and cause the plurality of lead terminals to be fitted thereinto, wherein the lead terminal includes a base end and a connection portion which is continuous to the base end and is suspended along a side surface of the component main body in the insertion direction of the electronic component, with a gap with respect to the side surface, the housing member includes a first housing chamber which guides and accommodates the component main body and a second housing chamber which accommodates and holds the terminal fitting, the first housing chamber is surrounded by a frame-shaped wall portion uprightly formed from a bottom wall on every side, and the second housing chamber is formed at the outside of the first housing chamber with the wall portion interposed therebetween, the terminal fitting includes a spring portion which presses the connection portion connected to the terminal fitting, and the spring portion is disposed so as to face the side surface of the component main body accommodated in the first housing chamber with the wall portion interposed therebetween, and the electronic component is inserted and accommodated in the housing member, and the plurality of lead terminals is respectively fitted to the plurality of terminal fittings, so that the electronic component is assembled to the housing member.

In this way, in the invention, the electronic component is essentially used in which the lead terminal extends along the side surface of the component main body. Then, when the component main body and the lead terminal of the electronic component are respectively inserted and accommodated in the first housing chamber and the second housing chamber of the housing member, a distance between the height position of the center of gravity of the component main body and the height position of the spring portion in the insertion direction of the electronic component may be shortened. Thus, since it is possible to effectively suppress a vibration mainly in a direction intersecting the insertion direction of the electronic component and to reduce a burden on the terminal fitting supporting the component main body, it is possible to suppress the vibration of the electronic component with a simple configuration without increasing the size of the terminal fitting or the housing member.

Incidentally, the component main body radiates heat when the electronic component is operated. For that reason, there is a need to release the heat generated from the component main body to the outside in order to satisfactorily maintain the function of the electronic component. However, the heat is easily accumulated in the component main body when the component main body is surrounded by the wall portion.

It is preferable that the electronic component includes a locking protrusion which is provided in a surface, facing the wall portion, of the component main body, the housing member is formed of a resin material and includes a penetration groove which is formed in the wall portion of the first housing chamber and to which the locking protrusion is locked when the component main body is accommodated in the first housing chamber, and the penetration groove is formed so that the component main body is exposed in a state where the locking protrusion is locked to the penetration groove Accordingly, when the locking protrusion is locked to the penetration groove, the heat of the component main body is radiated to the outside from a gap formed in the penetration groove so as to suppress an increase in the temperature of the component main body. For this reason, the function of the electronic component may be satisfactorily maintained. Further, the locking protrusion of the component main body is locked to the penetration groove so as to hold the component main body in the wall portion of the first housing chamber. For this reason, the rattling of the component main body may be suppressed, and hence the vibration of the electronic component may be further suppressed.

Meanwhile, in the electronic component, the base end of the lead terminal extends from the first housing chamber to the second housing chamber, and the conductive portion thereof is exposed to the outside. For this reason, there is a concern that an operator may be shocked when touching the conductive portion by a hand during work. Further, there is a concern that a short circuit may occur between the base ends when a tool contacts the adjacent base ends.

It is preferable that a part or the entirety of the base end of the lead terminal in the electronic component is coated by an insulation member. Accordingly, it is possible to prevent a trouble such as an electric shock and a short circuit in the lead terminal.

It is preferable to further include a cover member configured to cover an insertion opening of the first housing chamber into which the component main body is inserted, wherein the cover member is formed so as to be attachable to and detachable from the housing member.

Accordingly, since the component main body is surrounded by the first housing chamber and the cover member, it is possible to protect the component main body from the outside. Further, since it is possible to suppress the vibration of the component main body by the cover member, it is possible to reduce a burden on the terminal fitting. In this case, the cover member is formed so as to press the component main body accommodated in the first housing chamber. Accordingly, it is possible to more reliably suppress the vibration of the electronic component.

Further, the housing member may be assembled to the box-shaped frame instead of the cover member. That is, the electronic component assembly structure includes a box-shaped frame in which a frame-shaped side plate is uprightly formed from a side wall in the substantially horizontal direction and the plurality of housing members is accommodated and held along the side plate, and the housing member is held by the frame while the insertion opening into which the electronic component is inserted faces the side wall.

Accordingly, since the electronic component may be surrounded by the housing member and the side wall of the frame, it is possible to prevent water from adhering to the electronic component and to suppress the vibration of the electronic component. Further, since the insertion opening of the housing member is disposed so as to face the side wall of the frame, it is possible to shorten the dimension of the frame in the thickness direction and hence to decrease the installation space.

The present invention is briefly explained as described above. Further, a detail of the present invention will be more clarified by reading through a mode for carrying out the invention described below (hereinafter referred to as "embodiment") by referring to the accompanying drawings.

DETAILED DESCRIPTION OF THE PREFERRED EMBODIMENTS

Hereinafter, an embodiment of a relay module including an electronic component assembly structure according to the invention will be described with reference to the drawings. In the embodiment, a relay module will be described in which a relay is used as an electronic component and the relay is accommodated in a housing member. However, an electronic component assembly structure according to the invention may be also, of course, applied to an electronic component other than the relay.

In the embodiment, the application example of the relay module is not particularly limited. However, a case may be supposed in which the relay module is used in electronic equipment controlling a connection state between an electric component and a power supply in a mobile vehicle such as an automobile. Specifically, a case may be supposed in which the relay module is assembled to, for example, an electrical junction box (a junction box) provided between a battery and an electric component mounted on an automobile so as to control an electric power on/off state. Such a relay module may be integrated with the electrical junction box or may be separated therefrom.

Figure 1:
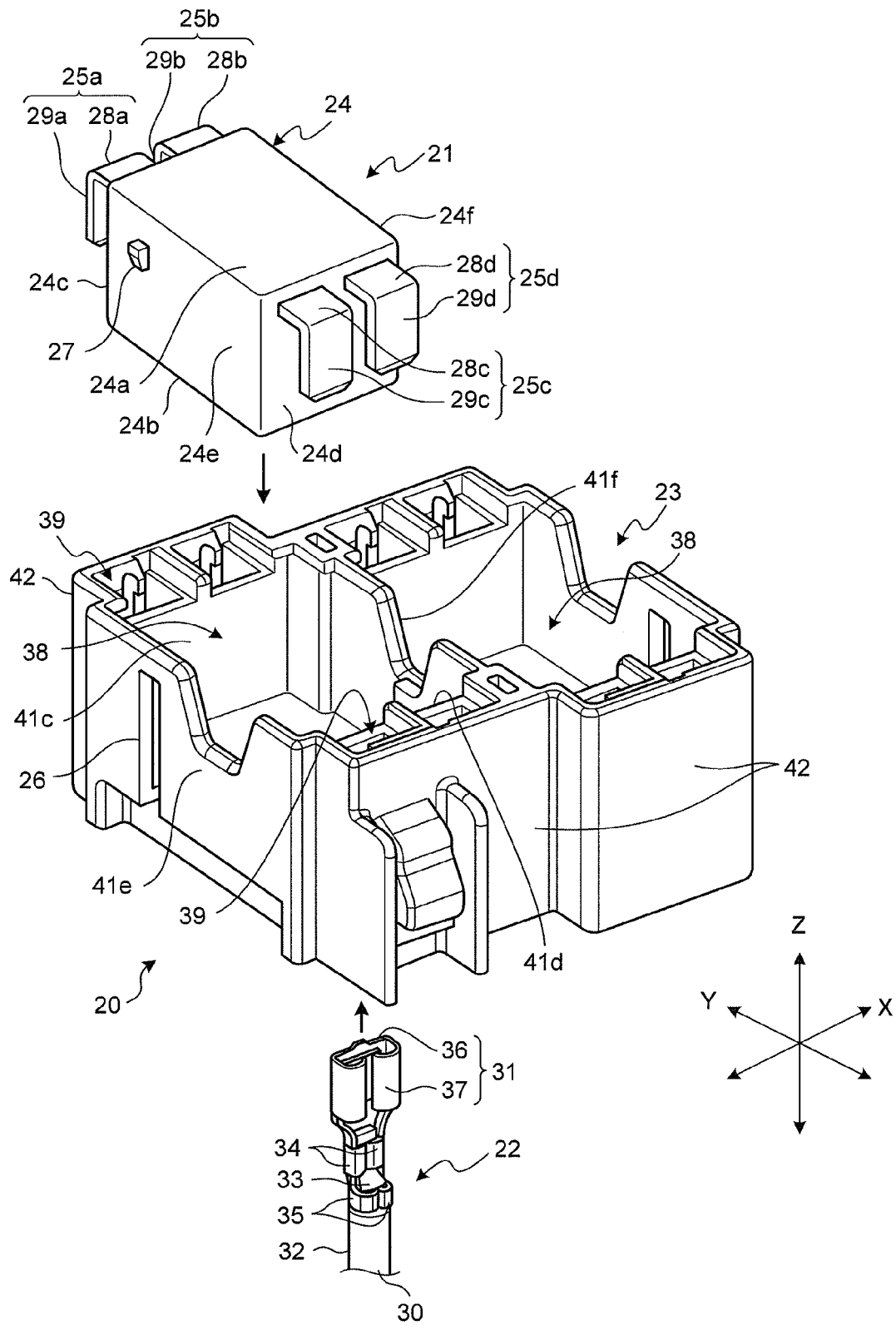
FIG. 1 is an assembly diagram of a relay module according to the invention.
Figure 2:
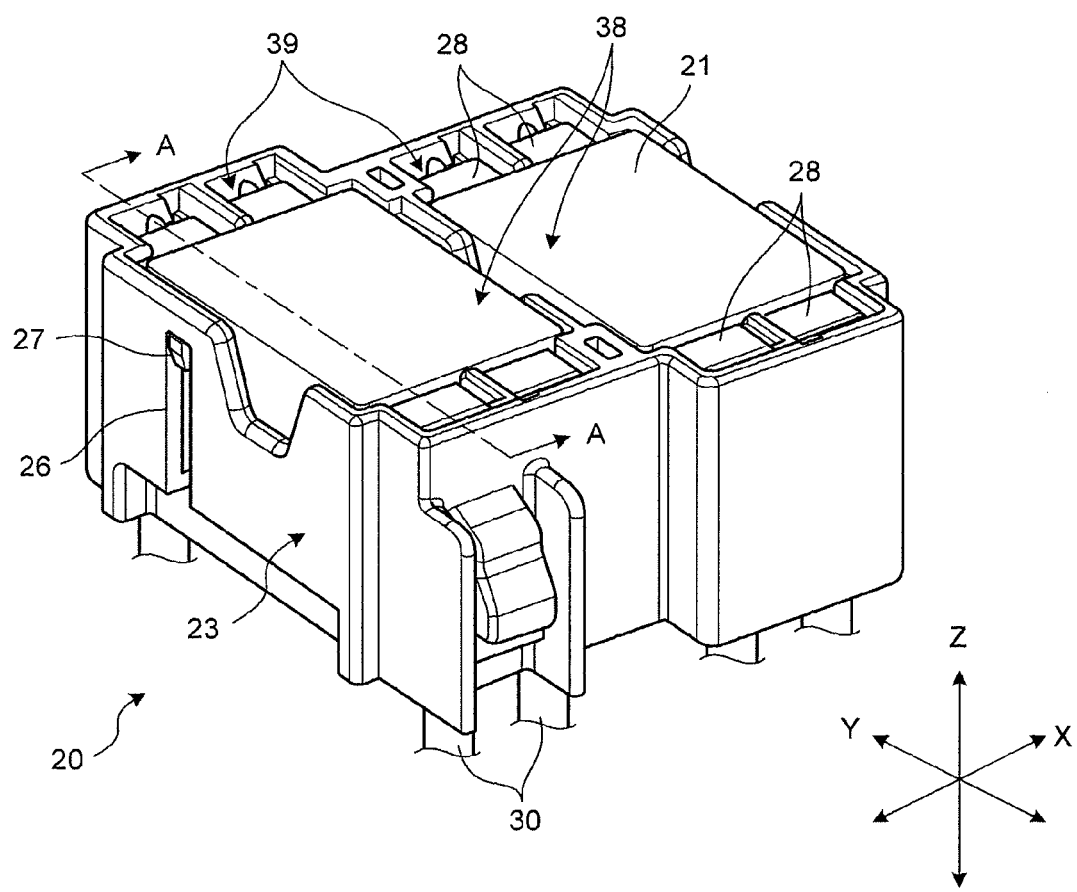
FIG. 2 is an entire configuration diagram of the relay module according to the invention.
Figure 3:
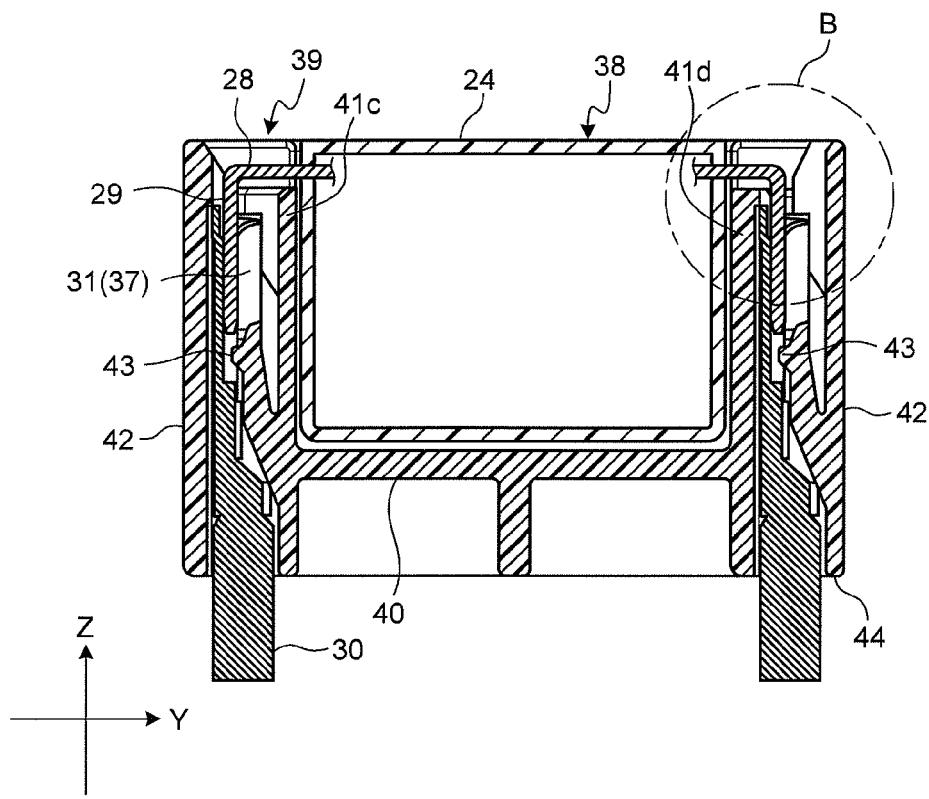
FIG. 3 is a longitudinal sectional view taken along the line A-A of FIG. 2.

FIG. 1 is an assembly diagram of a relay module 20 according to the embodiment, and FIG. 2 is an entire configuration diagram of the relay module 20 of FIG. 1. FIG. 3 is a longitudinal sectional view when viewed from the direction of the arrow A-A of FIG. 2. Here, a part of a configuration of a housing member that accommodates a relay is omitted. In the following description, a direction indicated by the arrow X of FIG. 1 is set as the front to back direction, a direction indicated by the arrow Y is set as the left and right direction, and a direction indicated by the arrow Z is set as the up and down direction (hereinafter, the same applies to the drawings other than FIG. 1). Further, regarding the up and down direction, the upward direction of FIG. 1 is set as the upward side (the upside) and the downward direction thereof is set as the downward side (the downside). However, the up and down direction, the left and right direction, and the front to back direction may not match the respective directions in a state where the relay module 20 is actually mounted on a vehicle. Moreover, various components accommodated inside a relay body 24 are not illustrated in FIG. 3 (the same applies to FIGS. 4 and 6).

As illustrated in FIG. 1, the relay module 20 of the embodiment has a structure in which a relay 21, a terminal fitting 22, and a housing member 23 are assembled. In the embodiment, an example will be described in which one relay module 20 includes two relays 21. However, the number of the relays constituting the relay module is not limited to two. For example, the relay module may include only one relay or three or more relays. In addition, in a case where the relay module includes a plurality of relays, the relays 21 may have the same configuration as illustrated in FIG. 1. Further, the relays may have different configurations as will be described later (for example, see FIGS. 7 to 11).

The relay 21 includes the relay body 24 which corresponds to a rectangular parallelepiped component main body formed of a resin or the like and lead terminals 25 (25a to 25d) which correspond to four plate-shaped lead terminals protruding from the relay body 24. The relay body 24 includes surfaces (hereinafter, referred to as a top surface 24a and a bottom surface 24b) which face each other in the up and down direction, surfaces (hereinafter, referred to as a left side surface 24c and a right side surface 24d) which face each other in the left and right direction, and surfaces (hereinafter, referred to as a front surface 24e and a back surface 24f) which face each other in the front to back direction. The relay body 24 of the embodiment is formed in a rectangular parallelepiped shape which is elongated in the left and right direction, and four surfaces of the left side surface 24c, the right side surface 24d, the front surface 24e, and the back surface 24f become the side surfaces. In addition, the front surface 24e is provided with a locking protrusion 27 which engages with a penetration groove 26 formed in the housing member 23 as will be described later.

The lead terminals 25 respectively include plate-shaped base ends 28 (28a to 28d) which protrude from at least one surface of the relay body 24 and plate-shaped connection portions 29 (29a to 29d) which continuously extend from the base ends 28. The lead terminals 25a and 25b respectively include the base ends 28a and 28b which are separated from each other with a gap therebetween in the front to back direction of FIG. 1 and protrude from the left side surface 24c of the relay body 24 in the perpendicular direction and connection portions 29a and 29b in which the base ends 28a and 28b are bent in the perpendicular direction and are suspended along the left side surface 24c of the relay body 24 in the insertion direction (the direction of the arrow of FIG. 1) of the relay 21 toward the housing member 23, with a predetermined gap with respect to the left side surface 24c. Meanwhile, the lead terminals 25c and 25d respectively include base ends 28c and 28d which are separated from each other with a gap therebetween in the front to back direction of FIG. 1 and protrude from the right side surface 24d of the relay body 24 in the perpendicular direction and connection portions 29c and 29d in which the base ends 28c and 28d are bent in the perpendicular direction and are suspended along the right side surface 24d of the relay body 24 in the insertion direction of the relay 21 toward the housing member 23, with a predetermined gap with respect to the right side surface 24d.

The base ends 28a to 28d respectively protrude in a direction parallel to the top surface 24a and the bottom surface 24b of the relay body 24, and the protruding position is set to a common height position which is lower than the top surface 24a of the relay body 24. Meanwhile, the connection portions 29a to 29d extend in a direction parallel to the insertion direction of the relay 21, and the distance with respect to the facing side surface of the relay body 24 are common. Further, the connection portions 29a to 29d are set so that the height positions of the front ends (the lower ends) in the insertion direction of the relay 21 are common and higher than the bottom surface 24b of the relay body 24. In addition, the lead terminals 25a to 25d are formed so that the width of the base ends 28a to 28d and the connection portions 29a to 29d in a direction (the front to back direction) perpendicular to the extension direction is the same.

The terminal fitting 22 is an interface member that is connected to a terminal portion of an electrical wire 30 in order to electrically connect the electrical wire 30 to the relay 21. The terminal fitting 22 includes a female fitting portion 31 which is formed by processing a conductive metal plate member so that the connection portion 29 of the lead terminal 25 is fitted thereto, a pair of core wire crimping pieces 34 which swages a core wire 33 exposed when an insulation coating 32 of a terminal of the electrical wire 30 is peeled off, and a pair of external crimping pieces 35 which swages a front end portion of the insulation coating 32 of the electrical wire 30.

The fitting portion 31 includes a flat plate portion 36 which has a flat plate shape and supports the connection portion 29 of the fitted lead terminal 25 and a spring portion 37 which presses the connection portion 29, and the connection portion 29 which is pressed against the flat plate portion 36 by the spring portion 37 is fitted between the flat plate portion 36 and the spring portion 37. The spring portion 37 is formed as a pair of convex curved portions in which both ends of the flat plate portion 36 in the front to back direction are uprightly formed and the front end portions thereof are curved toward the vicinity of the center portion of the flat plate portion 36 in the front to back direction. That is, the spring portion 37 elastically deforms the front end thereof in a direction separated from the flat plate portion 36 so as to apply a pressing force (an elastic restoration force) to the connection portion 29 and to support the connection portion 29.

The fitting portion 31 includes a tapered surface in which the upper end surface of the spring portion 37 is gently inclined downward in a direction from a portion in which the spring portion 37 protrudes most from the flat plate portion 36 toward the flat plate portion 36. Thus, when the connection portion 29 of the lead terminal 25 is fitted into the fitting portion 31, the connection portion 29 is guided by the tapered surface of the spring portion 37 so that the connection portion 29 is smoothly fitted into the fitting portion 31.

Further, in FIG. 1, an example of the terminal fitting 22 is described in which the fitting portion 31 is of a so-called fastening type. However, the terminal fitting 22 is not limited to this type. For example, a configuration may be employed in which the fitting portion 31 is formed so as to have a rectangular cylindrical cross-section, a flat-plate-shaped spring portion is provided inside the fitting portion 31, and the connection portion 29 of the lead terminal 25 is pressed against the inner wall of the fitting portion 31 by the spring portion.

The housing member 23 is a resinous frame which accommodates and holds the relay 21 and the terminal fitting 22, and includes a first housing chamber 38 which guides and accommodates the relay body 24 and a second housing chamber 39 which accommodates and holds the terminal fitting 22. Further, in the embodiment, the housing member 23 is handled as a single member separated from the electrical junction box. However, the housing member 23 may be integrated with the electrical junction box as a part of a frame formed inside the electrical junction box.

As illustrated in FIG. 1, the housing member 23 of the embodiment is provided with two first housing chambers 38, and a pair of second housing chambers 39 is disposed so as to face each other with each first housing chambers 38 interposed therebetween. That is, the housing member 23 includes two housing spaces each including one first housing chamber 38 and two second housing chambers 39. Then, two terminal fittings 22 are respectively accommodated at predetermined positions in the second housing chamber 39 so as to correspond to the lead terminals 25 of the relay 21 inserted into the housing space.

As illustrated in FIG. 3, the first housing chamber 38 is surrounded by a bottom wall 40 and a wall portion 41 uprightly formed from the bottom wall 40, and is formed as a concave space of which the upside is opened to the outside. The wall portion 41 is uprightly formed from the bottom wall 40 so as to surround the side surface (the left side surface 24c, the right side surface 24d, the front surface 24e, and the back surface 24f) of the relay body 24 on every side, and guides and accommodates the relay body 24 in the first housing chamber 38. The first housing chamber 38 is formed in a rectangular parallelepiped shape a size larger than the relay body 24 and is used to smoothly accommodate the relay body 24 guided by the wall portion 41 and to keep the posture of the relay body 24 by the interference of the wall portion 41 with respect to four side surfaces of the accommodated relay body 24.

Further, as illustrated in FIG. 1, the penetration groove 26 which extends in the height direction of a wall portion 41e (the insertion direction of the relay body 24) so as to expose the first housing chamber 38 to the outside of the housing member 23 is formed in the wall portion 41e (the wall portion facing the front surface 24e of the relay body 24) other than a wall portion 41f which divides the adjacent first housing chambers 38 and two wall portions 41c and 41d as the partition walls with respect to the second housing chamber 39 among four wall portions 41 forming the first housing chamber 38. The locking protrusion 27 which protrudes from the side surface of the relay body 24 may be locked to the upper end of the penetration groove 26 when the relay body 24 is accommodated in the first housing chamber 38. The penetration groove 26 is formed so as to be larger than the locking protrusion 27. Specifically, since the entire length of the penetration groove 26 in the height direction is set to be longer than the entire length of the locking protrusion 27 in the height direction, the relay body 24 is exposed to the outside through the penetration groove 26 while the locking protrusion 27 is locked to the penetration groove 26 and the penetration groove 26 is not blocked by the locking protrusion 27.

The second housing chamber 39 is disposed at the outside of the wall portions 41c and 41d (hereinafter, simply referred to as the wall portion 41) of the first housing chamber 38, that is, the opposite side to the first housing chamber 38 with the wall portions 41c and 41d interposed therebetween, and is surrounded by a rectangular cylindrical frame formed by the wall portions 41 and a frame portion 42 of the housing member 23, so that a rectangular parallelepiped space of which upper and lower portions are exposed to the outside is formed. The second housing chamber 39 is provided with a lance 43 (a locking piece) which holds the terminal fitting 22. The lance 43 is formed as a integral member that is stretched in a cantilevered state from the wall portion 41 or the frame portion 42 toward the second housing chamber 39, and is deformable elastically.

In FIG. 3, the left lance 43 is stretched from the wall portion 41, and the right lance 43 is stretched from the frame portion 42. Thus, the lance 43 is formed as a so-called spring mechanism and presses and locks the lower edge of the spring portion 37 of the terminal fitting 22 by a restoration force in which the lance is restored from the elastically deformed state. Accordingly, the terminal fitting 22 is held by the second housing chamber 39 while the terminal fitting 22 is retained in the second housing chamber 39. Further, in the embodiment, the left and right lances 43 are formed so as to be stretched in the same direction, but may be formed in a bilaterally symmetric shape while being stretched in the opposite directions.

In order that the terminal fitting 22 is accommodated in the second housing chamber 39 and is held by the lance 43, the terminal fitting 22 is inserted from a lower opening 44 of the second housing chamber 39. Then, the terminal fitting 22 is inserted into the second housing chamber 39 until the front end portion (the fitting portion 31) contacts the lance 43. When an upward force (an insertion force) is applied to the terminal fitting 22 so that the terminal fitting 22 is further inserted into the second housing chamber 39 from this state, the lance 43 is elastically deformed while being pressed by the terminal fitting 22. In FIG. 3, the left lance 43 is elastically deformed so as to approach the wall portion 41, and the right lance 43 is elastically deformed so as to approach the frame portion 42. Then, when an insertion force is applied to the terminal fitting 22 against the restoration force for the elastic deformation, the terminal fitting 22 moves upward while the lance 43 slides on the fitting portion 31. When the terminal fitting 22 moves in this state and the lance 43 relatively reaches the lower edge of the spring portion 37 along the fitting portion 31, the lance 43 is elastically deformed so as to engage with the lower edge of the spring portion 37. In this way, since the lance 43 engages with the terminal fitting 22 so that the terminal fitting 22 is locked to the lance 43, it is possible to prevent the terminal fitting 22 from being separated from the second housing chamber 39. That is, the terminal fitting 22 is held by the second housing chamber 39.

Meanwhile, in the embodiment, the position of the relay 21 in the up and down direction in a state where the relay 21 is accommodated in the housing member 23, that is, the connection portion 29 of the lead terminal 25 is fitted to the spring portion 37 of the terminal fitting 22 is set to a predetermined height position so that the relay body 24 does not protrude from the upper end of the housing member 23 as illustrated in FIGS. 2 and 3. Here, the height position of the relay body 24 is determined by a position where the connection portion 29 of the lead terminal 25 is fitted to the spring portion 37 of the terminal fitting 22. That is, the terminal fittings 22 are held at a height position (the same height position) where the spring portion 37 directly holding the connection portion 29 of the lead terminal 25 faces the side surface of the relay body 24 accommodated in the first housing chamber 38 with the wall portion 41 interposed therebetween in the second housing chamber 39. Then, the upper end surface of the wall portion 41 is disposed at a predetermined height position lower than the upper end surface of the housing member 23 so as not to contact the base end 28 of the lead terminal 25 when the connection portion 29 of the lead terminal 25 is fitted to the spring portion 37 of the terminal fitting 22, and the bottom wall 40 is disposed at a predetermined height position where the bottom wall does not contact the bottom surface 24b of the relay body 24. Thus, since the relay 21 is held by the housing member 23 without the interference with the bottom wall 40 or the upper end surface of the wall portion 41 except for a portion where the connection portion 29 of the lead terminal 25 is fitted to the spring portion 37 of the terminal fitting 22 in the height direction of the housing member 23, the lead terminal 25 and the terminal fitting 22 may be reliably connected to each other, and hence a force of holding the relay 21 may be stabilized.

In a case where the relay 21 is assembled to the housing member 23 with such a configuration, the relay body 24 is guided along the wall portion 41 so as to be inserted into the first housing chamber 38 while the relay body 24 is brought into contact with the wall portion 41 of the first housing chamber 38 so that the relay 21 is not excessively inclined with respect to the first housing chamber 38 in a stable posture. When the vicinity of the lower end of the relay body 24 is accommodated in the first housing chamber 38, the front end (the lower end) of the connection portion 29 of the lead terminal 25 is positioned so as to face the fitting portion 31 above the terminal fitting 22. When the relay body 24 is inserted into the vicinity of the bottom wall 40 of the first housing chamber 38 while the connection portion 29 is positioned in this way, the connection portion 29 is inserted into a gap between the spring portion 37 and the flat plate portion 36 of the fitting portion 31, and is fitted by the pressing force of the spring portion 37. As illustrated in FIG. 2, in the relay module 20 which is assembled in this way, the relay 21 is held by the housing member 23, and the relay 21 is electrically connected to the electrical wire 30 through the terminal fitting 22.

Figure 14:
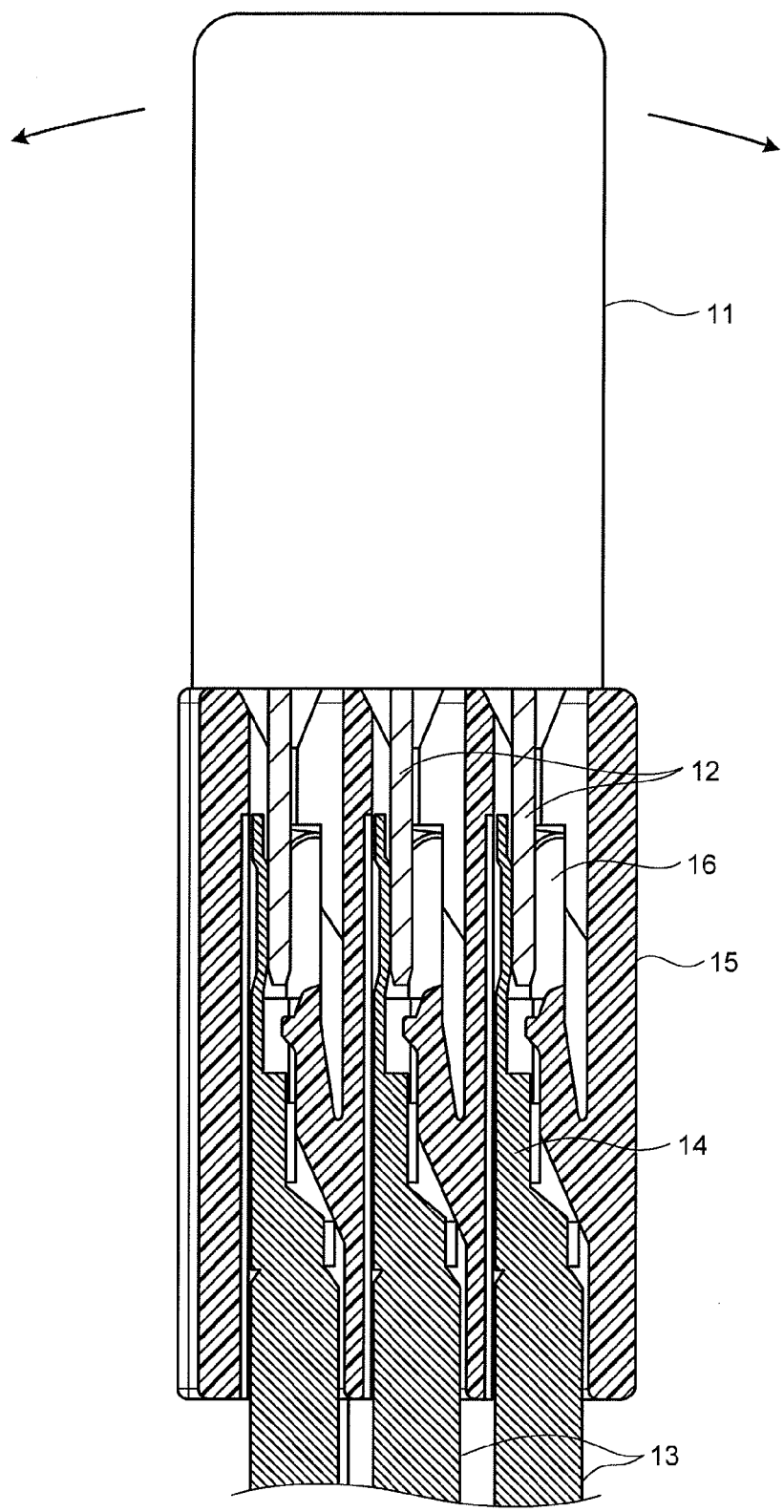
FIG. 14 is a longitudinal sectional view of a relay module of the related art.

Incidentally, there is a case where the electrical junction box which accommodates the relay module is vibrated with the rolling of the vehicle. In this case, the vibration is transmitted to the relay module, and hence there is a concern that the relay may be vibrated. For this reason, in the embodiment, since a distance between the height position of the center of gravity of the relay body 24 and the height position of the spring portion 37 of the terminal fitting 22 in the insertion direction of the relay 21 is shorter than the structure of the relay module (FIG. 14) of the related art, a vibration in a direction intersecting the insertion direction of the relay 21 is mainly suppressed, and hence a burden on the terminal fitting 22 holding the lead terminal 25 is reduced. Thus, the vibration resistance of the relay 21 may be improved. Further, according to the embodiment, since there is no need to improve a force of holding the lead terminal 25, for example, by providing a new structure for holding the relay 21 or increasing the size of the terminal fitting 22 in order to improve the force of holding the relay 21, it is possible to prevent a problem in which the relay module 20 has a complex structure or a large size. Further, the spring portion 37 which is held by the second housing chamber 39 may more effectively suppress the vibration of the relay 21 as the distance from the center of gravity of the relay body 24 decreases in the height direction.

Further, in the embodiment, the locking protrusion 27 is provided in the front surface 24e, facing the wall portion 41e, of the relay body 24, and the penetration groove 26 with which the locking protrusion 27 engages is provided in the wall portion 41e of the first housing chamber 38. For this reason, since the locking protrusion 27 engages with the penetration groove 26 so as to be locked to the upper end of the penetration groove 26 when the relay body 24 is accommodated in the first housing chamber 38, the relay 21 may be held by the housing member 23 with a high holding force, and hence the vibration of the relay 21 may be reliably suppressed. Further, since the force of holding the relay 21 is improved, it is possible to reduce a burden on the terminal fitting 22 that holds the lead terminal 25.

Further, since the entire length of the penetration groove 26 in the height direction is set to be longer than the entire length of the locking protrusion 27 in the height direction, the relay body 24 is exposed from the penetration groove 26 while the locking protrusion 27 is locked to the penetration groove 26. Accordingly, the heat of the relay body 24 may be radiated from the first housing chamber 38 to the outside through the penetration groove 26 even when the locking protrusion 27 is locked. In addition, the penetration groove 26 is not limited to the shape of the embodiment as long as the penetration groove is larger than the locking protrusion 27 and the relay body 24 is exposed while the locking protrusion 27 is locked.

Figure 4:
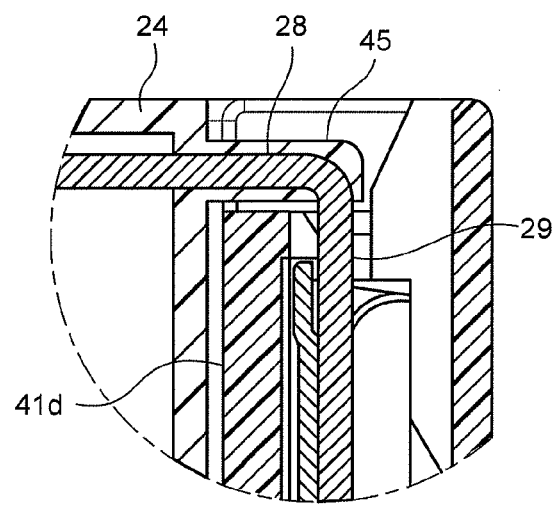
FIG. 4 is an enlarged diagram of the part B of FIG. 3.

Next, another embodiment of the relay 21 of the embodiment will be described with reference to FIG. 4. In FIG. 3, the conductive portion of the lead terminal 25 is completely exposed. However, as illustrated in FIG. 4, a part of the lead terminal 25, for example, a shoulder portion of the base end 28 may be coated by an insulation member 45 that protrudes from the side surface of the relay body 24. Since the base end 28 is coated in this way, it is possible to prevent a trouble such as an electric shock caused when a hand or a tool contacts the conductive portion of the relay 21 assembled to the housing member 23 or a short circuit generated between the lead terminals 25. The insulation member 45 of the embodiment may be integrally molded with the relay body 24 by resin molding (for example, insert-molding) when the relay 21 is manufactured. Regarding the coating of the lead terminal 25, at least a surface of a portion exposed to the outside from the first housing chamber 38 and the second housing chamber 39 and possibly touched by a hand or a tool may be coated. Further, the insulation member 45 may not be continuous to the relay body 24 as illustrated in FIG. 4, and may formed only at a predetermined position separated from the relay body 24. Further, the insulation member 45 may be formed of an insulation material other than a resin.

Figure 5:
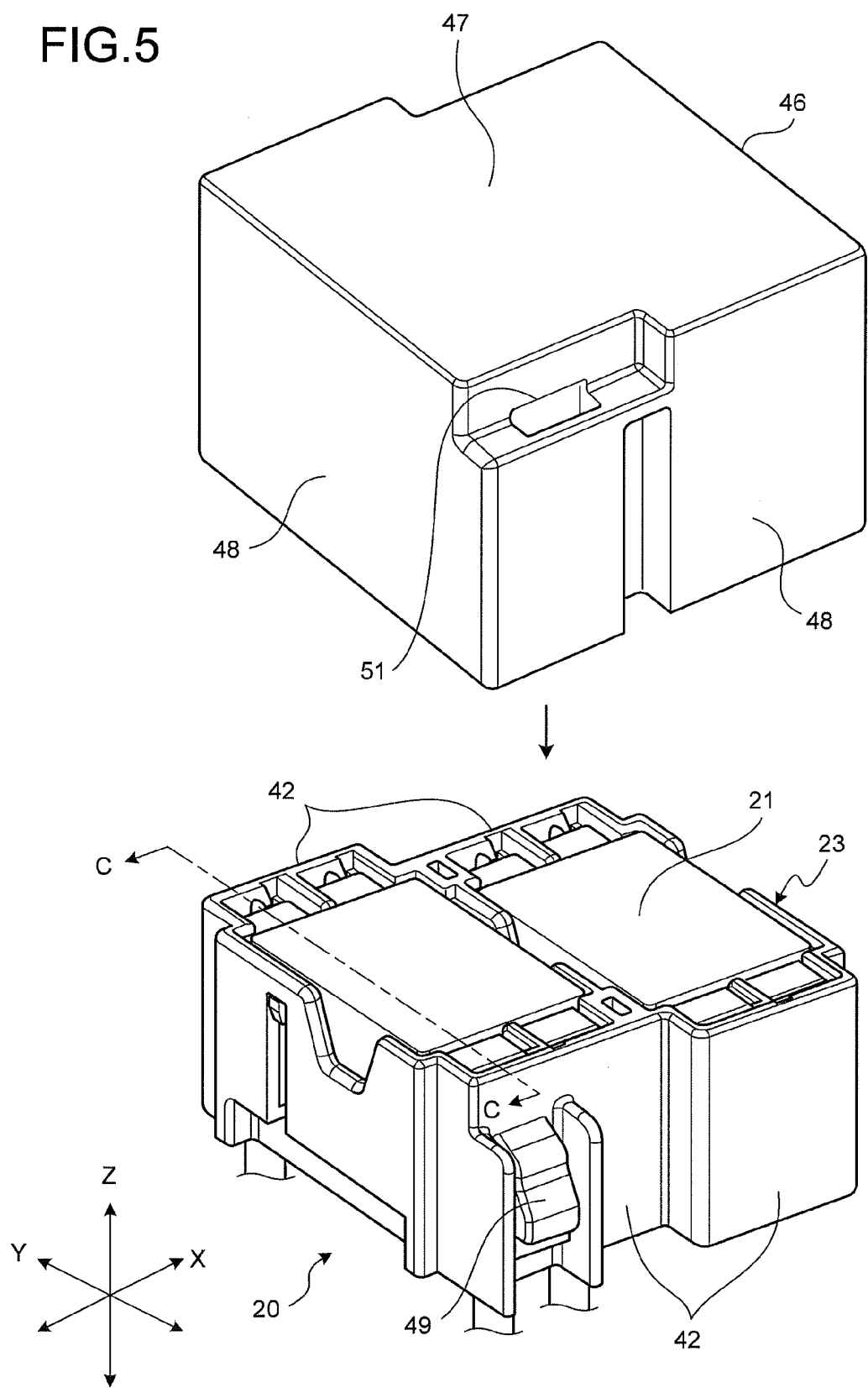
FIG. 5 is an assembly diagram in which a cover member is assembled to the relay module of FIG. 2.
Figure 6:
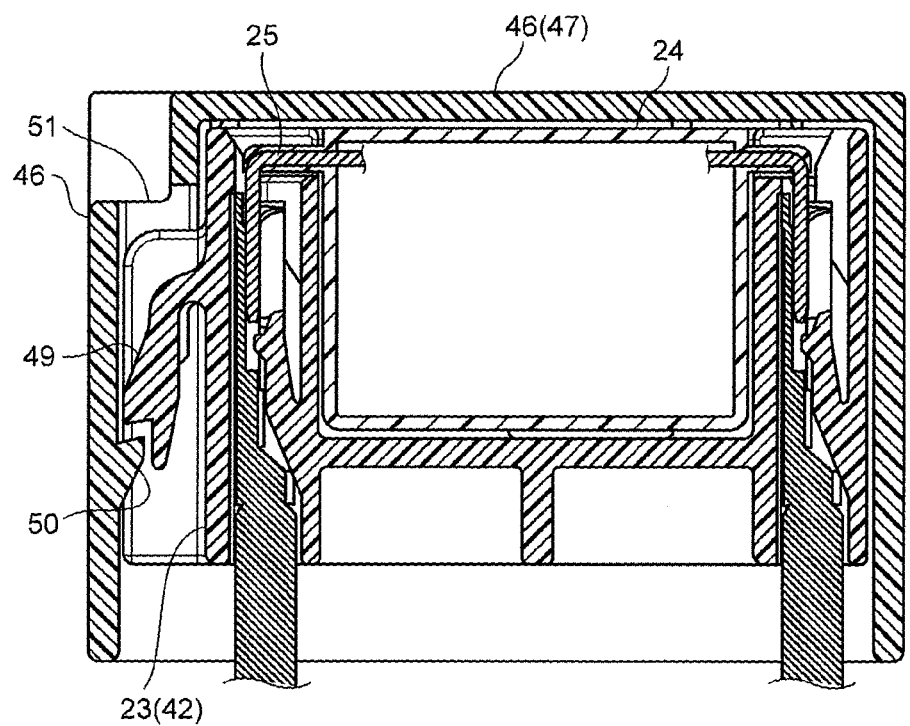
FIG. 6 is a longitudinal sectional view taken along the line C-C in a state where the cover member is assembled in FIG. 5.

Next, an example will be described in which the relay 21 is protected while another member covers the housing member 23 of the embodiment. FIG. 5 is an assembly diagram in which the cover member covers the upper portion of the housing member 23 accommodating the relay 21, and FIG. 6 is a longitudinal sectional view illustrating a state where the cover member of FIG. 5 is assembled when viewed from the direction of the arrow C. As illustrated in FIG. 5, the housing member 23 that accommodates the relay 21 is covered by a cover member 46 from the upside thereof.

The cover member 46 is a box-shaped case (lid) which is formed of a resin and has an opening at the lower portion thereof, and forms a concave space which is surrounded by a ceiling wall 47 and four wall portions 48 uprightly formed from the ceiling wall 47 so that the lower portion of the concave space is opened to the outside. The wall portions 48 are uprightly formed from the ceiling wall 47 so as to surround the housing member 23 on every side, and the housing member 23 is accommodated in the space. The cover member is formed so as to be attachable or detachable along the wall surface of the housing member 23.

An elastically deformable locking hook 49 is provided in the frame portion 42 of the housing member 23 so as to protrude in a cantilevered state. Meanwhile, the wall portion facing the frame portion 42 in the cover member 46 is provided with a locking protrusion 50 which protrudes so as to be locked to the locking hook 49 when the cover member 46 is attached to the housing member 23.

In a case where the cover member 46 is assembled to the housing member 23, the cover member 46 moves toward the lower portion of the housing member 23 while covering the upper portion of the housing member 23. At this time, the wall portion 48 of the cover member 46 is guided along the wall surface of the frame portion 42 of the housing member 23. When the locking protrusion 50 of the cover member 46 contacts the locking hook 49 of the housing member 23, the locking hook 49 slides on the locking protrusion 50 so as to be pressed by the locking protrusion 50, and is elastically deformed in a direction moving close to the frame portion 42 of the housing member 23. Then, when the cover member 46 is further pressed so that the locking protrusion 50 climbs over the locking hook 49, the locking hook 49 is restored from the elastically deformed state and the cover member 46 is locked while being attached to the housing member 23.

Meanwhile, in a case where the cover member 46 locked to the housing member 23 is separated from the housing member 23, a tool is inserted from a tool insertion hole 51 formed in the cover member 46, and the tools is pressed against the locking hook 49 so as to deform the locking hook 49 elastically in a direction moving close to the frame portion 42. Thus, the cover member 46 may be separated from the housing member 23 when the locking state between the locking hook 49 and the locking protrusion 50 is released. Further, in the embodiment, an example has been described in which the relay module 20 is provided with the locking hook 49 and the locking protrusion 50 that make a pair. However, the invention is not limited to this example as long as the cover member 46 is locked to the housing member 23.

When the cover member 46 is locked to the housing member 23, the ceiling wall 47 of the cover member 46 contacts at least one of the relay body 24 and the upper end of the frame portion 42 of the housing member 23 due to, for example, the own weight of the cover member 46.

Accordingly, since the relay 21 may be surrounded by the housing member 23 and the cover member 46, the water repellence of the relay 21 may be improved. Further, since the cover member 46 is attached, the relay body 24 is held inside a space surrounded by the first housing chamber 38 and the ceiling wall 47 of the cover member 46. That is, since the vibration of the relay body 24 is limited within the space when the relay module 20 is vibrated, the vibration of the relay body 24 may be suppressed. As a result, a burden on the terminal fitting 22 that holds the lead terminal 25 may be reduced.

Further, since the assembly directions of the cover member 46 and the relay 21 with respect to the housing member 23 are the same, the relay 21 may be also assembled to the housing member 23 when the cover member 46 is assembled to the housing member 23. For example, the cover member 46 is formed so that the relay 21 is inserted to an appropriate position of the housing member 23 in the insertion direction when the cover member 46 is assembled and locked to the housing member 23. Thus, initially even when the relay 21 is not inserted to an appropriate position of the housing member 23, the cover member 46 covers the housing member 23 from the upside thereof so that the cover member is locked to the housing member. In this way, the relay 21 may be assembled. Further, since the vibration of the relay body 24 with respect to the housing member 23 may be regulated when the cover member 46 is assembled to the housing member 23, it is possible to reduce a load (an insertion force) generated when the connection portion 29 is inserted into the spring portion 37 by weakly setting the holding force of the relay 21 with respect to the housing member 23, that is, the holding force of holding the relay body 24 by fitting the connection portion 29 of the lead terminal 25 to the spring portion 37 of the terminal fitting 22. Accordingly, according to the embodiment, since it is possible to reduce a work burden generated when the relay 21 is inserted and assembled to the housing member 23, it is possible to improve the work efficiency in the assembly of the relay 21.

In the embodiment, an example has been described in which the ceiling wall 47 of the cover member 46 contacts the relay body 24 of the relay 21 accommodated in the housing member 23 by the own weight while the cover member 46 is locked to the housing member 23, but the invention is not limited to this example. For example, the ceiling wall 47 may be provided with a step shape or a shape of a protrusion portion contacting the relay body 24 so that the ceiling wall 47 presses the relay body 24 downward by a predetermined pressing force while the cover member 46 is locked to the housing member 23. Accordingly, since the relay 21 may be interposed between the housing member 23 and the cover member 46, the vibration of the relay 21 with respect to the housing member 23 may be prevented. Further, since the holding force of holding the relay body 24 may be weakly set by fitting the connection portion 29 of the lead terminal 25 to the spring portion 37 of the terminal fitting 22, the work efficiency in the assembly of the relay 21 may be further improved.

Further, the cover member 46 of the embodiment is formed so as to cover both insertion openings of the first housing chamber 38 and the second housing chamber 39 of the housing member 23, but may be formed so as to cover at least the insertion opening of the first housing chamber 38. For example, in a case where the cover member is formed by the ceiling wall 47 and four wall portions 48 as in the cover member 46 of the embodiment, an opening may be formed at a position corresponding to the insertion opening of the second housing chamber 39 of the ceiling wall 47. When at least the insertion opening of the first housing chamber 38 is covered in this way, it is possible to improve the vibration resistance of the relay 21 and the work efficiency in the assembly of the relay 21.

Next, another embodiment of the cover member 46 will be described. The above-described cover member 46 is used while being assembled to each housing member 23. However, instead of this configuration, a configuration may be employed in which a frame capable of accommodating the plurality of housing members 23 is formed so that the frame accommodates and assembles the housing members 23 and forms a single relay module as a whole.

Figure 7:
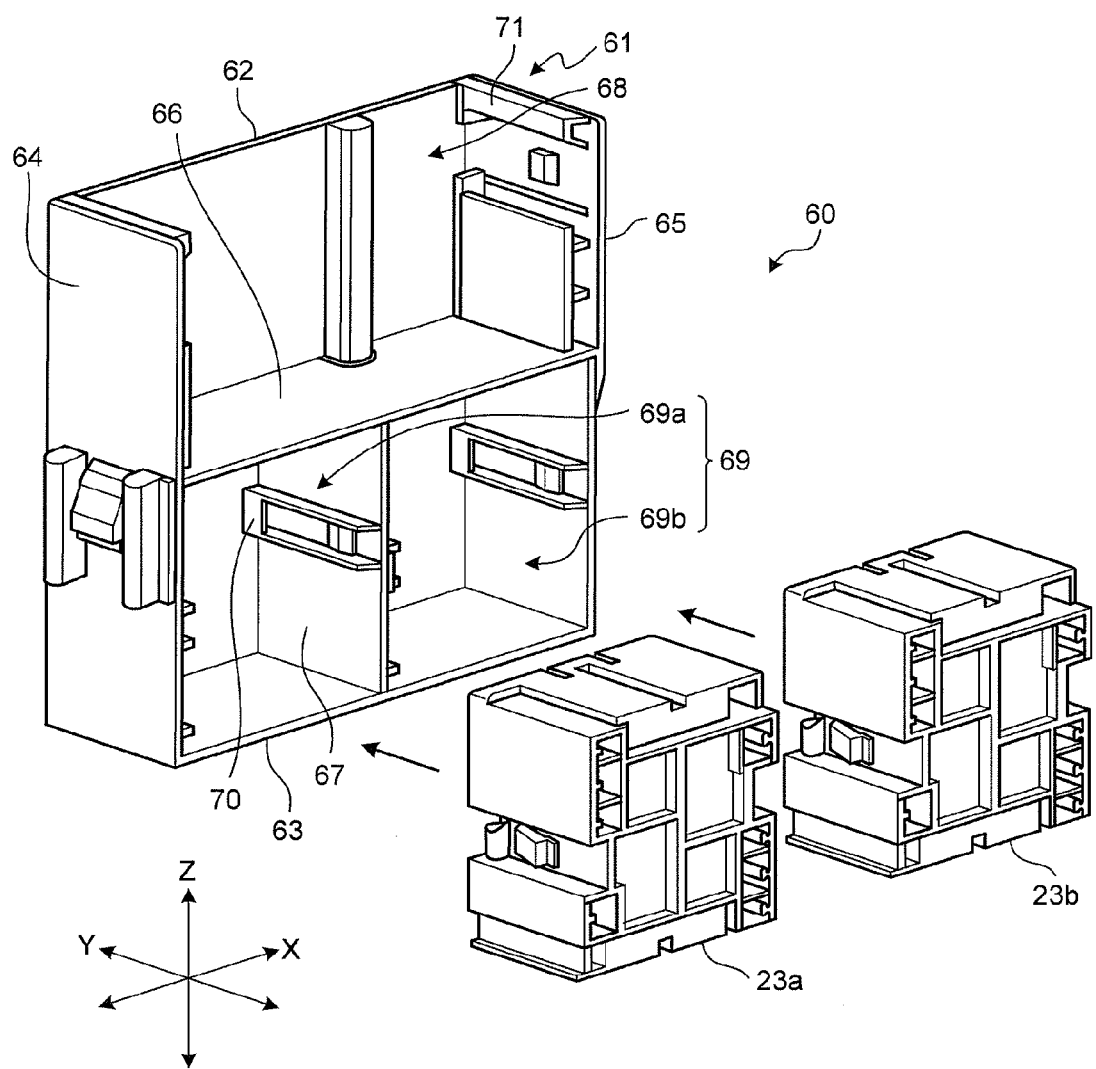
FIG. 7 is an assembly diagram different from the assembly state of the relay module of FIG. 5.
Figure 8:
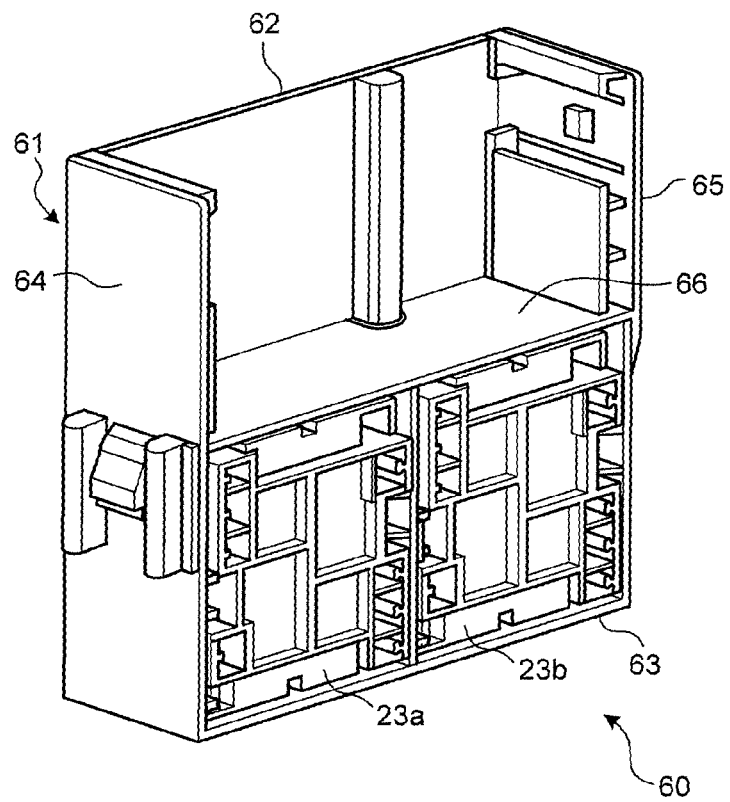
FIG. 8 is a perspective view illustrating a state after the relay module of FIG. 7 is assembled.
Figure 9:
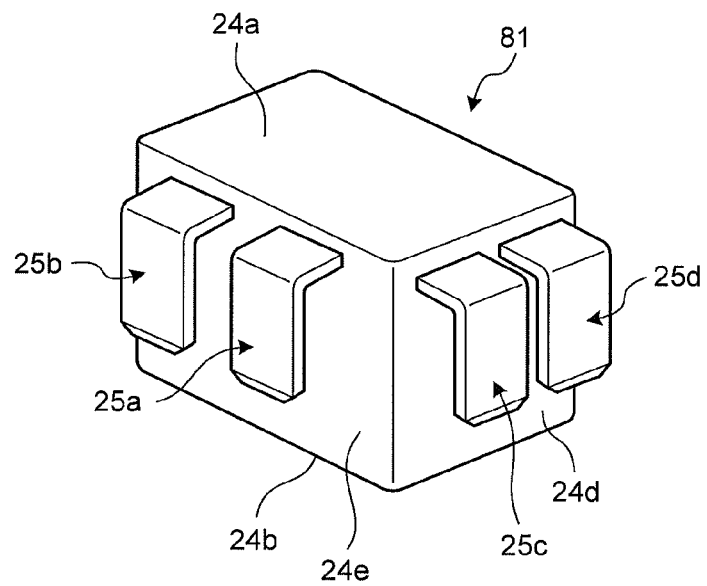
FIG. 9 is a perspective view of another embodiment of a relay.
Figure 10:
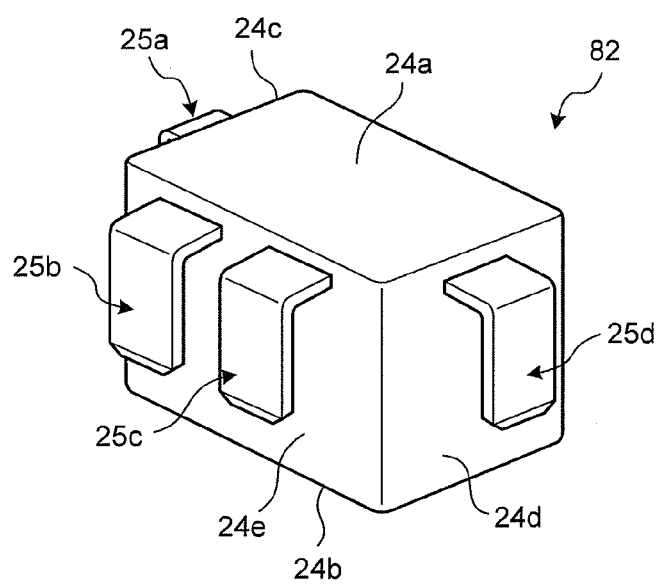
FIG. 10 is a perspective view of another embodiment of the relay.
Figure 11:
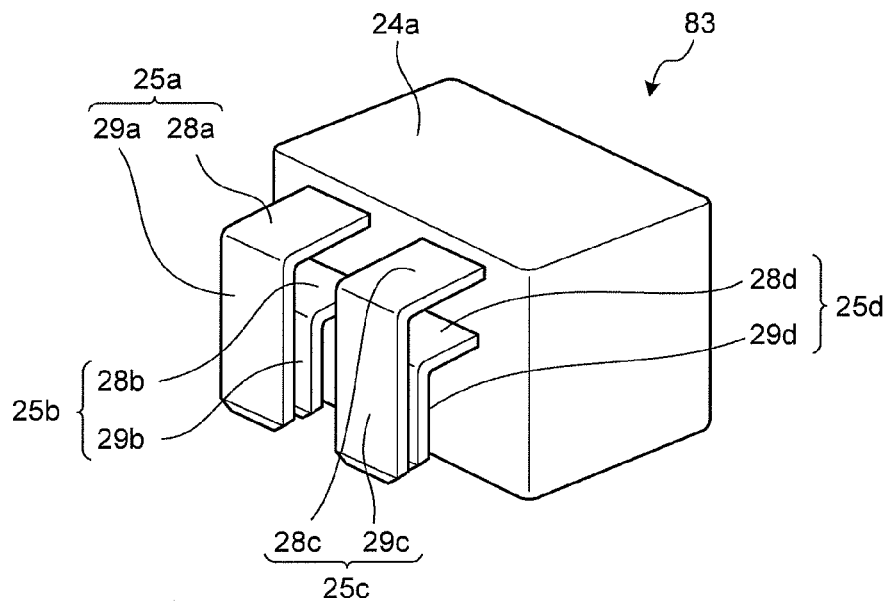
FIG. 11 is a perspective view of another embodiment of the relay.

FIG. 7 is an assembly diagram of the relay module of the embodiment, and FIG. 8 is a perspective view illustrating an entire configuration after assembly in FIG. 7. A relay module 60 of the embodiment has a configuration in which the housing members 23 (23a and 23b) holding the relay 21 are assembled to a frame 61. The frame 61 is formed as a box-shaped container which is formed by molding a resin or the like so that an upper portion and a side portion are opened. The frame 61 has a configuration in which a bottom plate 63, side plates 64 and 65, and partitions 66 and 67 are uprightly formed substantially in the perpendicular direction (substantially in the horizontal direction) from a side plate 62 having a flat plate shape. The partition 66 is provided so as to be substantially parallel to the bottom plate 63, and the upper and lower portions thereof are respectively provided with an upper space 68 and a lower space 69. The lower space 69 is provided with the partition 67 which contacts the partition 66 substantially in the perpendicular direction, and hence the lower space is divided into two left and right spaces 69a and 69b. The left and right lower spaces 69a and 69b which are formed in this way respectively accommodate laterally the housing members 23a and 23b each accommodating the relay 21 so that the insertion opening of the relay 21, that is, the top surface 24a of the relay body 24 faces the side plate 62 (in the direction of the arrow).

Each of the side plates 64 and 65 forming the lower space 69 is provided with a guide member 70 which protrudes toward the lower space 69 so as to guide the housing member 23 and to support the accommodated housing member 23. Each of the side plates 64 and 65 forming the upper space 68 is provided with a guide member 71 which protrudes toward the upper space 68 so as to guide electronic components when receiving the housing member 23 or other electronic components (hereinafter, referred to as electronic components) in the upper space and to support the accommodated electronic components. In addition, the electronic components which are accommodated in the upper space 68 may be directly placed on the partition 66 or an electrical wire accommodating space may be formed while a gap is formed with respect to the partition 66.

As described above, since the posture of the relay 21 with respect to the housing member 23 is kept even when the housing member 23 is disposed laterally while the relay is accommodated in the housing member 23, any problem does not arise even when the housing member 23 accommodating the relay 21 is assembled to, for example, the frame 61 while falling down laterally. The housing member 23 is received into each of the lower spaces 69a and 69b of the frame 61 along the guide member 70 in the horizontal direction (the arrow of FIG. 7), and is held inside the frame 61 by using a known structure. Thus, the relay 21 is interposed between the side plate 62 and the housing member 23, and the periphery thereof is surrounded by the bottom plate 63, the side plate 64 or the side plate 65, and the partitions 66 and 67. Accordingly, since it is possible to prevent water from adhering to the relay 21 and to prevent the vibration of the relay 21, it is possible to obtain the same effect when the cover member 46 is attached to the housing member 23.

Further, in the embodiment, since the housing member 23 is laterally accommodated in the frame 61, the thickness (the thickness in the left and right direction) of the relay module 60 may be decreased. For this reason, the installation space for the relay module may be decreased. Accordingly, it is possible to improve the space utilization efficiency of the electrical junction box and to improve a degree of freedom in design of the electrical junction box. Further, in FIG. 8, the electronic components accommodated in the upper space 68 are omitted, but the upper space 68 may accommodate the electronic components in the lateral direction or the longitudinal direction as in the lower space. In this way, since the frame 61 is provided with the guide members 70 and 71 that support the housing member 23 or the electronic components, the accommodating direction of each space may be freely set.

In the above-described embodiment, a configuration of the relay module 20 in which the relay 21 of FIG. 1 is assembled has been described as the electronic component assembly structure of the invention, but the configuration of the electronic component is not limited to this example. That is, another relay module may be employed as long as a rectangular parallelepiped (including a cubic) component main body (the relay body 24) and a lead terminal (the lead terminal 25) protruding from at least one surface of the component main body are provided and the lead terminal includes a base end (the base end 28) protruding from at least one surface of the component main body and a connection portion (the connection portion 29) continuous to the base end and extending along the side surface with a gap with respect to the side surface of the component main body in the insertion direction of the electronic component. For example, even in a case where an electronic component (hereinafter, a relay) of another embodiment illustrated in FIGS. 9 to 13 is assembled, the same effect as the relay 21 of FIG. 1 may be obtained. Hereinafter, an embodiment different from the relay 21 of FIG. 1 will be described with reference to FIGS. 9 to 13. However, the same reference sign will be given to the same component of FIG. 1, and the description thereof will not be repeated.

In the relay 21 of FIG. 1, two lead terminals 25 are provided in each of a pair of parallel surfaces of the relay body 24. However, in a relay 81 of FIG. 9, two lead terminals 25 are provided in the two adjacent side surfaces (for example, the front surface 24e and the right side surface 24d) among four side surfaces excluding the top surface 24a and the bottom surface 24b. In this case, in the housing member 23 accommodating the relay 81, the second housing chambers 39 are disposed at two positions with the first housing chamber 38 and the wall portion 41 interposed therebetween so as to correspond to the arrangement of the lead terminals 25, and are disposed so as to perpendicular to each other. Then, each second housing chamber 39 holds the terminal fitting 22 as many as the lead terminal 25 so as to correspond to the lead terminal 25 inserted thereinto.

Further, the lead terminal 25 is provided at two side surfaces of the relay body 24, but may be provided at three or more side surfaces. In a relay 82 of FIG. 10, the lead terminal 25 is provided in each of three side surfaces (for example, the front surface 24e, the right side surface 24d, and the left side surface 24c) among four side surfaces excluding the top surface 24a and the bottom surface 24b. In the relay 82, the front surface 24e is provided with two lead terminals 25b and 25c, the right side surface 24d is provided with the lead terminal 25d, and the left side surface 24c is provided with the lead terminal 25a. In this case, the housing member that accommodates the relay 82 is provided with three second housing chambers 39 so as to correspond to the arrangement of the lead terminals 25, interposing the wall portion 41 between the second housing chamber 39 and the first housing chamber 38, and the second housing chamber 39 holds the terminal fitting 22 as many as the lead terminal 25 so as to correspond to the lead terminal 25 inserted thereinto.

Further, the lead terminal 25 is provided at a plurality of side surfaces of the relay body 24, but may be provided at one side surface. In a relay 83 of FIG. 11, four lead terminals 25 are provided in one side surface (for example, the front surface 24e) among four side surfaces excluding the top surface 24a and the bottom surface 24b. The relay 83 is formed so that the height position of the front end (the lower end) of the connection portion 29 of each of the lead terminals 25a to 25d is set to the same height position higher than the bottom surface 24b of the relay body 24. However, the base ends 28b and 28d protrude from the same height position on the relay body 24, and the base ends 28a and 28c protrude from the same height position higher than the base ends 28b and 28d. In the lead terminals 25a and 25b, the base ends 28a and 28b and the connection portions 29a and 29b are disposed in parallel with a predetermined gap therebetween, and the lead terminal 25b is disposed at the inside of the curved portion of the lead terminal 25a so as to be hidden when the relay body 24 is viewed from the front surface 24e side. Even in the lead terminals 25c and 25d, the base ends 28c and 28d and the connection portions 29c and 29d are disposed in parallel with a predetermined gap therebetween, and the lead terminal 25d is disposed at the inside of the curved portion of the lead terminal 25c so as to be hidden when the relay body 24 is viewed from the front surface 24e side. In this case, the housing member that accommodates the relay 83 is provided with one second housing chambers 39 so as to correspond to the arrangement of the lead terminals 25, interposing the wall portion 41 between the second housing chamber 39 and the first housing chamber 38, and the second housing chamber 39 holds four terminal fittings 22 so as to correspond to the lead terminals 25.

Figure 12:
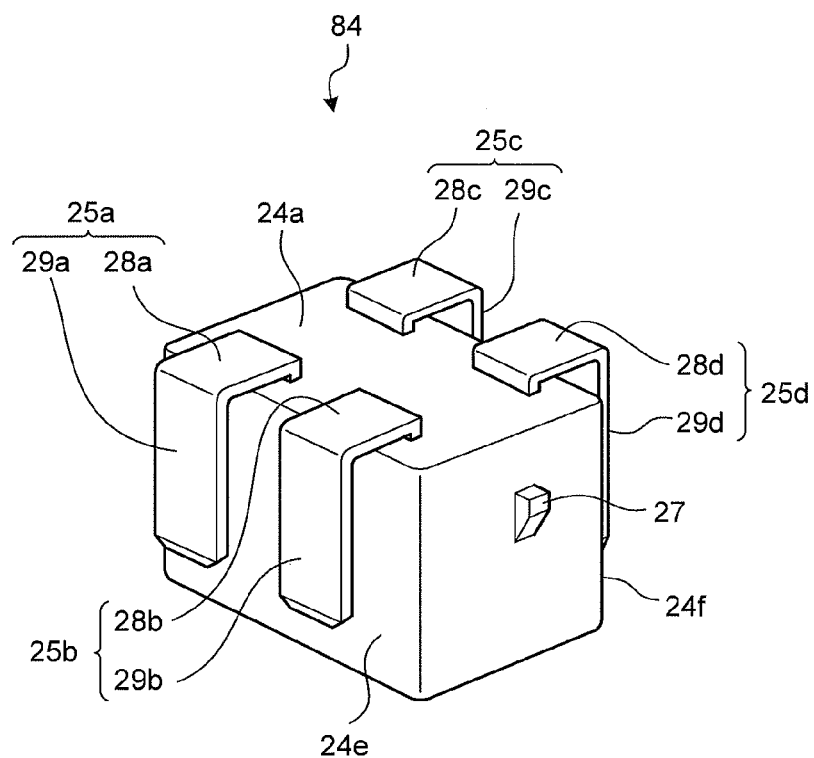
FIG. 12 is a perspective view of another embodiment of the relay.

Meanwhile, in the above-described relays, the lead terminal 25 is provided at the side surface of the relay body 24. However, as illustrated in FIG. 12, the lead terminal 25 may be provided at the top surface 24a of the relay body 24. In a relay 84 of FIG. 12, four lead terminals 25 are provided at the top surface 24a. In the lead terminals 25a and 25b, the base ends 28a and 28b protrude from the vicinity of the front surface 24e of the top surface 24a of the relay body 24 and extend at the same height so as to extend while being bent forward in the substantially perpendicular direction. In the other two lead terminals 25c and 25d, the base ends 28c and 28d protrude from the vicinity of the back surface 24f of the top surface 24a of the relay body 24 and extend at the same height so as to extend while being bent backward in the substantially perpendicular direction. The connection portions 29a and 29b of the lead terminals 25a and 25b are curved substantially perpendicularly and downward from the protruding front ends of the base ends 28a and 28b, and extend in parallel with a predetermined gap with respect to the front surface 24e of the relay body 24. The connection portions 29c and 29d of the remaining two lead terminals 25c and 25d are curved substantially perpendicularly and downward from the protruding front ends of the base ends 28c and 28d, and extend in parallel with a predetermined gap with respect to the back surface 24f of the relay body 24. In this case, the housing members that accommodate the relay 84 are provided with two second housing chambers 39 so as to correspond to the arrangement of the lead terminals 25 and are disposed in parallel, interposing the wall portion 41 between the second housing chamber 39 and the first housing chamber 38. Then, each second housing chamber 39 holds the terminal fitting 22 as many as the lead terminal 25 so as to correspond to the lead terminal 25 inserted thereinto. In addition, the relay 84 has a configuration in which the lead terminal 25 extends in parallel to the front surface 24e and the back surface 24f of the relay body 24, but the invention is not limited to this example. For example, the lead terminal may extend in parallel to other one or plural side surfaces.

Figure 13:
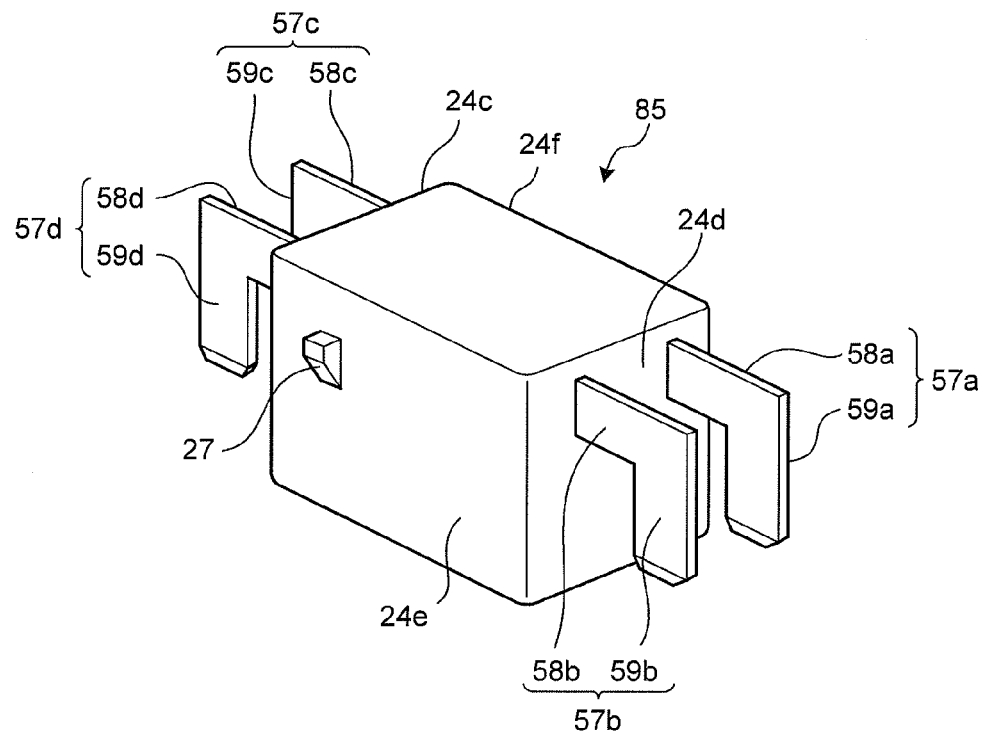
FIG. 13 is a perspective view of another embodiment of the relay.

Further, the above-described relays are formed so that the thickness direction of the connection portion 29 of the lead terminal 25 intersects (in a direction perpendicular to) the side surface of the relay body 24 facing the connection portion 29, but may be formed in parallel to the side surface of the relay body 24 as illustrated in FIG. 13. In a relay 85 of FIG. 13, fitting portions 59 (59a to 59d) and base ends 58 (58a to 58d) of lead terminals 57 (57a to 57d) are respectively formed in a flat plate shape in parallel to the front surface 24e and the back surface 24f of the relay body 24, and are disposed so that the thickness directions (the front to back directions) of the connection portions 59a and 59b of two lead terminals 57a and 57b are parallel to the right side surface 24d of the relay body 24, and are disposed so that the thickness directions (the front to back directions) of the connection portions 59c and 59d of the remaining two lead terminals 57c and 57d are parallel to the left side surface 24c of the relay body 24. In addition, each base end 58 protrudes from the side surface of the relay body 24 in the perpendicular direction, and each connection portion 59 extends in parallel with a gap with respect to the side surface of the relay body 24 as in the other relays. In this case, the housing members that accommodate the relay 85 are provided with the relay 85 are provided with two second housing chambers 39 so as to correspond to the arrangement of the lead terminals 57 and are disposed in parallel, interposing the wall portion 41 between the second housing chamber 39 and the first housing chamber 38. Then, each second housing chamber 39 holds the terminal fitting 22 as many as the lead terminal 57 so as to correspond to the lead terminal 57 inserted thereinto. Of course, the terminal fitting 22 is disposed so as to correspond to the direction of the lead terminal 57.

Further, for example, in the relay structure of FIG. 1, FIGS. 9 to 11, and FIG. 13, the insulation member having a flat plate shape may be provided in the top surface 24a of the relay body 24 so as to cover the lead terminal 25 (57). In this case, the insulation member may be integrally formed with the relay body 24. Alternatively, the insulation member may be provided as a separate member and may be attached to the top surface 24a of the relay body 24. Here, the external shape or the dimension of the insulation member is set in accordance with the shape of the openings of the first housing chamber 38 and the second housing chamber 39 of the housing member 23. Accordingly, the lead terminal 25 (57) may be insulated and protected from the outside by the insulation member, and hence the intrusion of water to the first housing chamber 38 or the second housing chamber 39 may be prevented. Thus, the water repellence of the relay may be improved. Further, a part of the stress acting on the lead terminal 25 (57) may be applied to the insulation member when the fitting portion 29 (59) of the lead terminal 25 (57) is inserted into the terminal fitting 22. For this reason, a burden on the lead terminal 25 (57) may be reduced, and hence the deformation of the lead terminal 25 (57) caused by the insertion stress may be prevented. Further, it is desirable that the insulation member may be provided so as to contact the lead terminal 25 (57), but the insulation member may be provided so as not to contact the lead terminal.

Figure 15A:
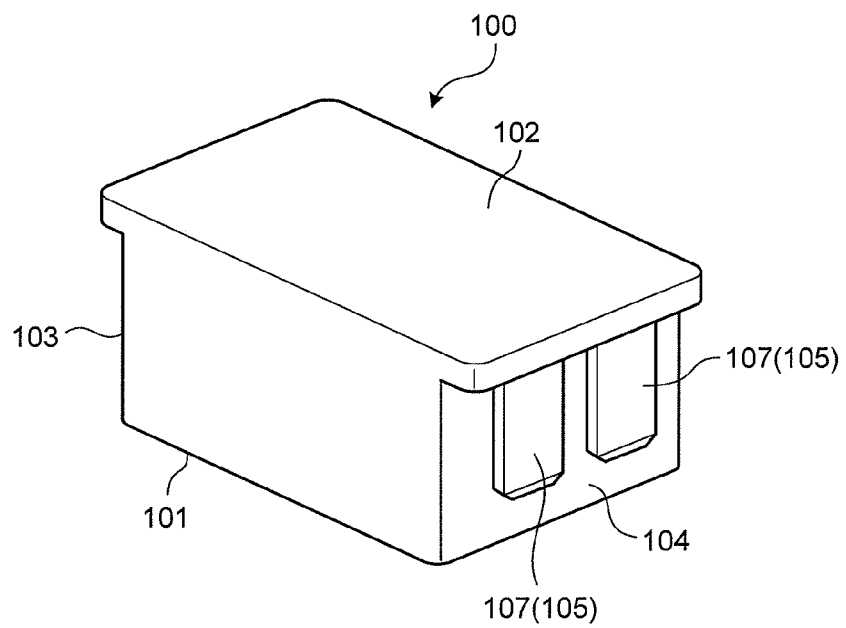
FIG. 15A is a perspective view of a relay in which a base end of a lead terminal is surrounded by a resin.

Further, in the above-described relays, the base end of the lead terminal is completely exposed, but at least a part of the base end may be surrounded by a resin. FIG. 15A is a perspective view of a relay in which a base end of a lead terminal is surrounded by a resin, and FIG. 15B is a side view of the relay illustrated in FIG. 15A.

Figure 15B:
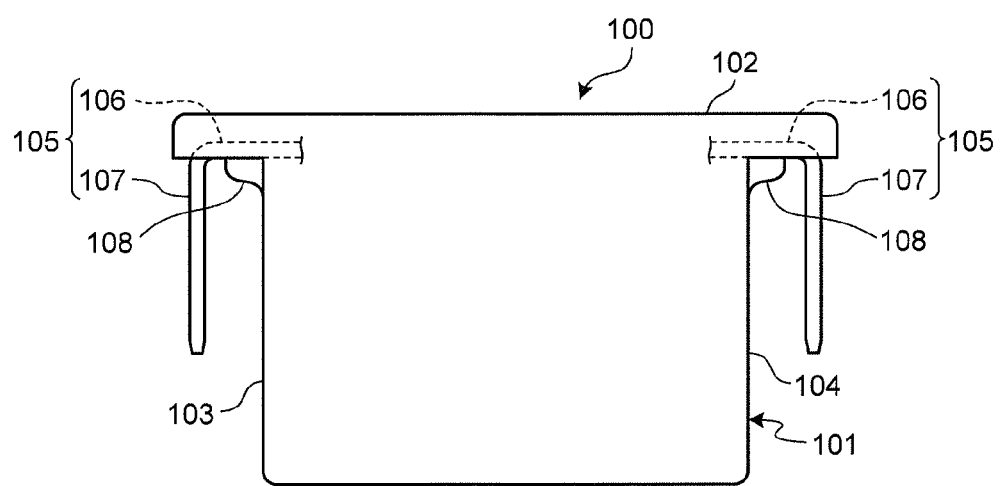
FIG. 15B is a side view of the relay illustrated in FIG. 15A.

As illustrated in FIGS. 15A and 15B, a relay 100 has a configuration in which an insulation member 102 having a flat plate shape is attached along one surface (for example, a surface corresponding to the top surface 21a of the embodiment) of a relay body 101. The insulation member 102 is formed by molding an insulation resin so that the insulation member is formed in a substantially rectangular shape in the top view. The insulation member 102 extends in a direction perpendicular to a pair of opposite side surfaces 103 and 104 of the relay body 101. Each of the side surfaces 103 and 104 is provided with two lead terminals 105. The lead terminals 105 are disposed so that a contact portion 107 faces the side surfaces 103 and 104. The insulation member 102 is formed so as to surround a base end 106 of each lead terminal 105.

As illustrated in FIG. 15B, the base end 106 of the lead terminal 105 is entirely surrounded by the insulation member 102 in the axial direction thereof, and the contact portion 107 of the lead terminal 105 is provided so as to protrude from the lower surface of the insulation member 102. A protrusion portion 108 is formed in a step shape at a position where the insulation member 102 intersects the side surfaces 103 and 104. The protrusion portion 108 contacts the upper end surface of the wall portion when the relay 100 is assembled to the housing member. In addition, the base end 106 of the lead terminal 105 may be disposed so as to protrude from the protrusion portion 108 or may be disposed so as to protrude from the side surfaces 103 and 104 of the relay body 101.

Accordingly, it is possible to support the base end 106 of each lead terminal 105 by the insulation member 102 from the upside thereof. Thus, since it is possible to largely reduce a load on the lead terminal 105 when the lead terminal 105 is fitted into each terminal fitting, it is possible to prevent the deformation of the lead terminal 105. As a result, it is possible to satisfactorily keep the electric connection state between the lead terminal 105 and the terminal fitting and to prevent degradation in the holding force of the relay 100 with respect to the housing member. Further, since the base end 106 of each lead terminal 105 is surrounded by the insulation member 102, the short circuit between the adjacent lead terminals 105 may be prevented.

While the embodiment of the invention has been described with reference to the drawings, the above-described embodiment is merely an example of the invention, and the invention is not limited to only the configuration of the above-described embodiment. Of course, modifications in design within the scope not departing from the spirit of the invention may be included in the invention.

For example, in the embodiment, a relay module in which a relay is an electronic component has been described, but the electronic component is not limited to the relay. That is, the invention may be also applied to another electronic component as long as the electronic component includes a component main body and a lead terminal similar to the relay body and the lead terminal of the embodiment. Specifically, the invention may be also applied to, for example, a fuse or a control module in which components such as an electronic circuit board are accommodated in a resin case.

The present invention can suppress the vibration of the electronic component with a simple configuration.

What is claimed is:

1. An electronic component assembly structure comprising:
    an electronic component configured to include a rectangular parallelepiped component main body and a plurality of lead terminals provided in the component main body;
    a housing member configured to accommodate the electronic component inserted thereinto; and
    a plurality of terminal fittings configured to be held by the housing member and cause the plurality of lead terminals to be fitted thereinto, wherein
    the lead terminal includes a base end and a connection portion which is continuous to the base end and is suspended along a side surface of the component main body in the insertion direction of the electronic component, with a gap with respect to the side surface,
    the housing member includes a first housing chamber which guides and accommodates the component main body and a second housing chamber which accommodates and holds the terminal fitting,
    the first housing chamber is surrounded by a frame-shaped wall portion uprightly formed from a bottom wall on every side, and the second housing chamber is formed at the outside of the first housing chamber with the wall portion interposed therebetween,
    the terminal fitting includes a spring portion which presses the connection portion connected to the terminal fitting, and the spring portion is disposed so as to face the side surface of the component main body accommodated in the first housing chamber with the wall portion interposed therebetween, and
    the electronic component is inserted and accommodated in the housing member, and the plurality of lead terminals is respectively fitted to the plurality of terminal fittings, so that the electronic component is assembled to the housing member.

2. The electronic component assembly structure according to claim 1, wherein
    the electronic component includes a locking protrusion which is provided in a surface, facing the wall portion, of the component main body,
    the housing member is formed of a resin material and includes a penetration groove which is formed in the wall portion of the first housing chamber and to which the locking protrusion is locked when the component main body is accommodated in the first housing chamber, and
    the penetration groove is formed so that the component main body is exposed in a state where the locking protrusion is locked to the penetration groove.

3. The electronic component assembly structure according to claim 2, wherein
    a part or the entirety of the base end of the lead terminal in the electronic component is coated by an insulation member.

4. The electronic component assembly structure according to claim 2, further comprising:
    a cover member configured to cover an insertion opening of the first housing chamber into which the component main body is inserted, wherein
    the cover member is formed so as to be attachable to and detachable from the housing member.

5. The electronic component assembly structure according to claim 2, further comprising:
    a box-shaped frame in which a frame-shaped side plate is uprightly formed from a side wall in the substantially horizontal direction and the housing member is accommodated and held along the side plate, wherein
    the housing member is held by the frame while the insertion opening into which the electronic component is inserted faces the side wall.

6. An electrical junction box comprising:
    the electronic component assembly structure according to claim 2.

7. The electronic component assembly structure according to claim 1, wherein
    a part or the entirety of the base end of the lead terminal in the electronic component is coated by an insulation member.

8. The electronic component assembly structure according to claim 7, further comprising:
    a cover member configured to cover an insertion opening of the first housing chamber into which the component main body is inserted, wherein
    the cover member is formed so as to be attachable to and detachable from the housing member.

9. The electronic component assembly structure according to claim 3, further comprising:
    a box-shaped frame in which a frame-shaped side plate is uprightly formed from a side wall in the substantially horizontal direction and the housing member is accommodated and held along the side plate, wherein the housing member is held by the frame while the insertion opening into which the electronic component is inserted faces the side wall.

10. An electrical junction box comprising:
the electronic component assembly structure according to claim 7.

11. The electronic component assembly structure according to claim 1, further comprising:
a cover member configured to cover an insertion opening of the first housing chamber into which the component main body is inserted, wherein
the cover member is formed so as to be attachable to and detachable from the housing member.

12. The electronic component assembly structure according to claim 11, wherein
the cover member is formed so as to press the component main body accommodated in the first housing chamber.

13. An electrical junction box comprising:
the electronic component assembly structure according to claim 12.

14. An electrical junction box comprising:
the electronic component assembly structure according to claim 11.

15. The electronic component assembly structure according to claim 1, further comprising:
a box-shaped frame in which a frame-shaped side plate is uprightly formed from a side wall in the substantially horizontal direction and the housing member is accommodated and held along the side plate, wherein
the housing member is held by the frame while the insertion opening into which the electronic component is inserted faces the side wall.

16. An electrical junction box comprising:
the electronic component assembly structure according to claim 15.

17. An electrical junction box comprising:
the electronic component assembly structure according to claim 1.

* * * * *